(12) United States Patent
Helsley

(10) Patent No.: US 10,530,840 B2
(45) Date of Patent: Jan. 7, 2020

(54) CONTAINER-BASED SYSTEM ANALYTICS APPLIANCE

(71) Applicant: CA, Inc., Islandia, NY (US)

(72) Inventor: David Lee Helsley, McKinney, TX (US)

(73) Assignee: CA, Inc., Islandia, NY (US)

( * ) Notice: Subject to any disclaimer, the term of this patent is extended or adjusted under 35 U.S.C. 154(b) by 58 days.

(21) Appl. No.: 15/476,504

(22) Filed: Mar. 31, 2017

(65) Prior Publication Data
US 2018/0285250 A1 Oct. 4, 2018

(51) Int. Cl.
*H04L 29/08* (2006.01)

(52) U.S. Cl.
CPC .................... *H04L 67/10* (2013.01)

(58) Field of Classification Search
CPC .................. G06F 11/3688; G06F 11/3409
USPC .................. 711/173; 717/124, 127; 709/224
See application file for complete search history.

(56) References Cited

U.S. PATENT DOCUMENTS

| 9,501,377 | B2 * | 11/2016 | Greene | G06F 9/4843 |
| 9,842,045 | B2 * | 12/2017 | Heorhiadi | H04L 41/5038 |
| 2006/0236067 | A1 * | 10/2006 | Attinella | G06F 11/3409 |
| | | | | 711/173 |
| 2008/0263309 | A1 * | 10/2008 | Attinella | G06F 11/3636 |
| | | | | 711/173 |
| 2013/0326051 | A1 * | 12/2013 | LeGendre | H04L 43/0817 |
| | | | | 709/224 |
| 2016/0269482 | A1 * | 9/2016 | Jamjoom | H04L 67/1095 |
| 2017/0046146 | A1 * | 2/2017 | Jamjoom | G06F 8/62 |
| 2017/0060621 | A1 * | 3/2017 | Whipple | G06F 9/5072 |

OTHER PUBLICATIONS

Mikko Korhonen, "Analyzing Resource Usage on Multitenant Cloud Cluster for Invoicing", 2017.*

* cited by examiner

*Primary Examiner* — Phillip H Nguyen
(74) *Attorney, Agent, or Firm* — Alliance IP, LLC

(57) ABSTRACT

Data is received describing attributes of a first mainframe computing system at a software appliance, where the software appliance is hosted at least in part on a second mainframe computing system and the software appliance includes a plurality of microservices hosted in a plurality of software containers. The data is sent to a first one of the plurality of microservices hosted in a first one of the plurality of software containers, where the first microservice includes data science logic. The data is analyzed using the data science logic to generate a result at the first microservice, and it is determined whether to send the result to a second one of the plurality of microservices hosted in a second one of the plurality of software containers, where the second microservice includes logic to determine an alert condition based on results received from other microservices in the software appliance.

19 Claims, 10 Drawing Sheets

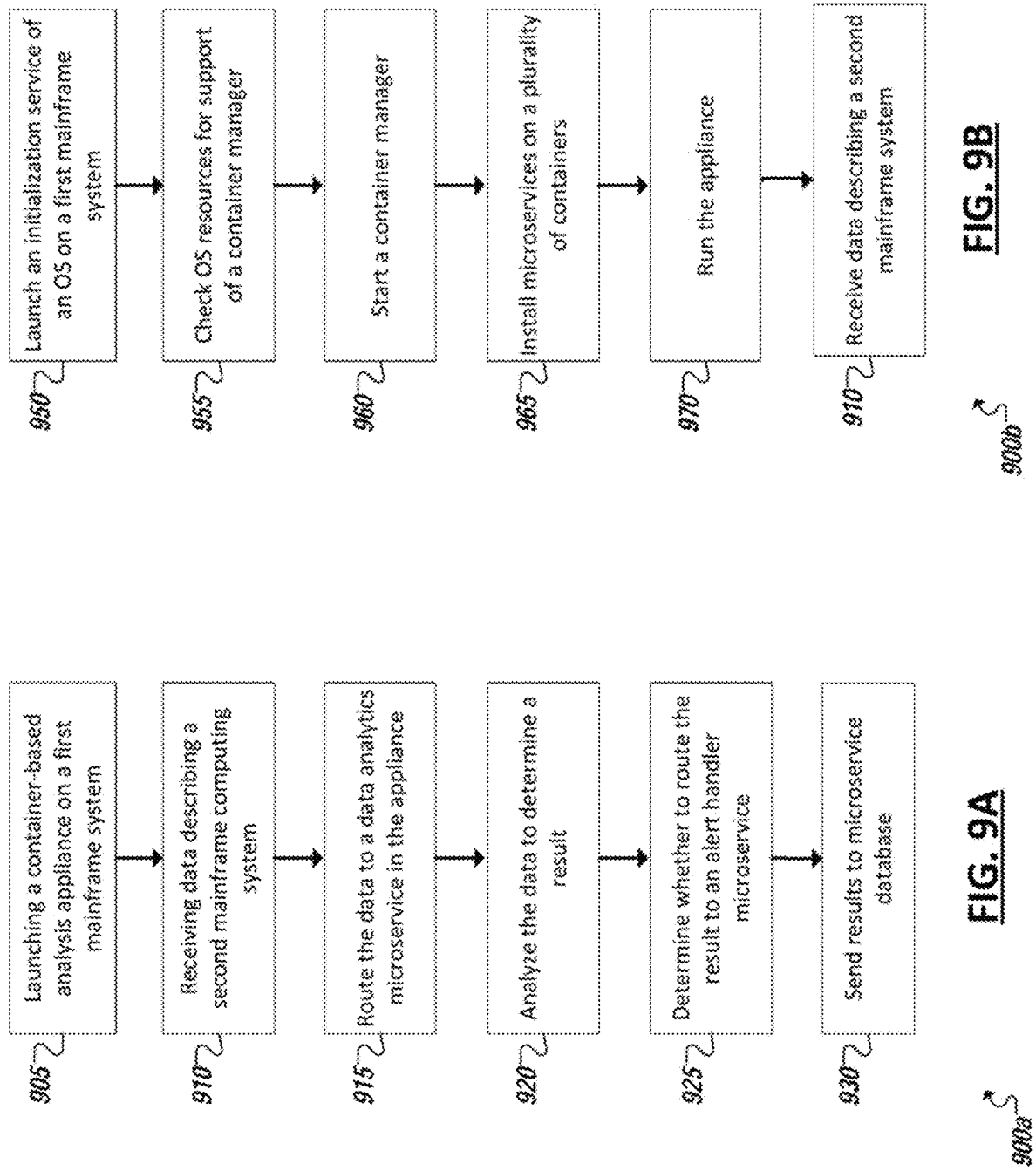

CONTAINER-BASED SYSTEM ANALYTICS APPLIANCE

BACKGROUND

The present disclosure relates in general to the field of software system analytics, and more specifically, to a container-based system analytics appliance.

As software applications become increasingly sophisticated, their complexity also increases, along with the number and variety of underlying components. Developing a complex software application may be challenging, as its numerous components must each be developed, configured, tested, and maintained. Configuring a software application, for example, may become very difficult as the number of its underlying components increases. Further, some software systems may be developed according to customized or proprietary designs or requirements. Security, performance analytics, and other tools used as general purpose solutions to support the development and maintenance of software systems may be deficient for performing similar services to such custom, proprietary, or legacy systems.

BRIEF SUMMARY

According to one aspect of the present disclosure, data may be received describing attributes of a first mainframe computing system at a software appliance, where the software appliance is hosted at least in part on a second mainframe computing system and the software appliance includes a plurality of microservices hosted in a plurality of software containers. The data may be sent to a first one of the plurality of microservices hosted in a first one of the plurality of software containers, where the first microservice includes data science logic. The data may be analyzed using the data science logic to generate a result at the first microservice, and it is determined whether to send the result to a second one of the plurality of microservices hosted in a second one of the plurality of software containers, where the second microservice includes logic to determine an alert condition based on results received from other microservices in the software appliance According to another aspect of the present disclosure, an initialization service of an operating system is stared, where the operating system is hosted at least in part on a first logical partition (LPAR) of a first mainframe system and automates orchestration of a data analytics appliance on the first mainframe system, where automated orchestration of the data analytics appliance includes: starting a container system check service to determine whether resources are provided in the mainframe system to support a container manager; launching, upon completion of the container system check service, the container manager; starting an appliance manager to install a plurality of microservices on a plurality of containers provided by the container manager, where the plurality of microservices are interconnected to provide the data analytics appliance; and receiving data from another second mainframe system for processing by the data analytics appliance.

BRIEF DESCRIPTION OF THE DRAWINGS

FIGS. 9A-9B illustrate flowcharts showing example techniques involving an example appliance to be composed of multiple interconnected container-based tools.

Like reference numbers and designations in the various drawings indicate like elements.

DETAILED DESCRIPTION

Figure 1:
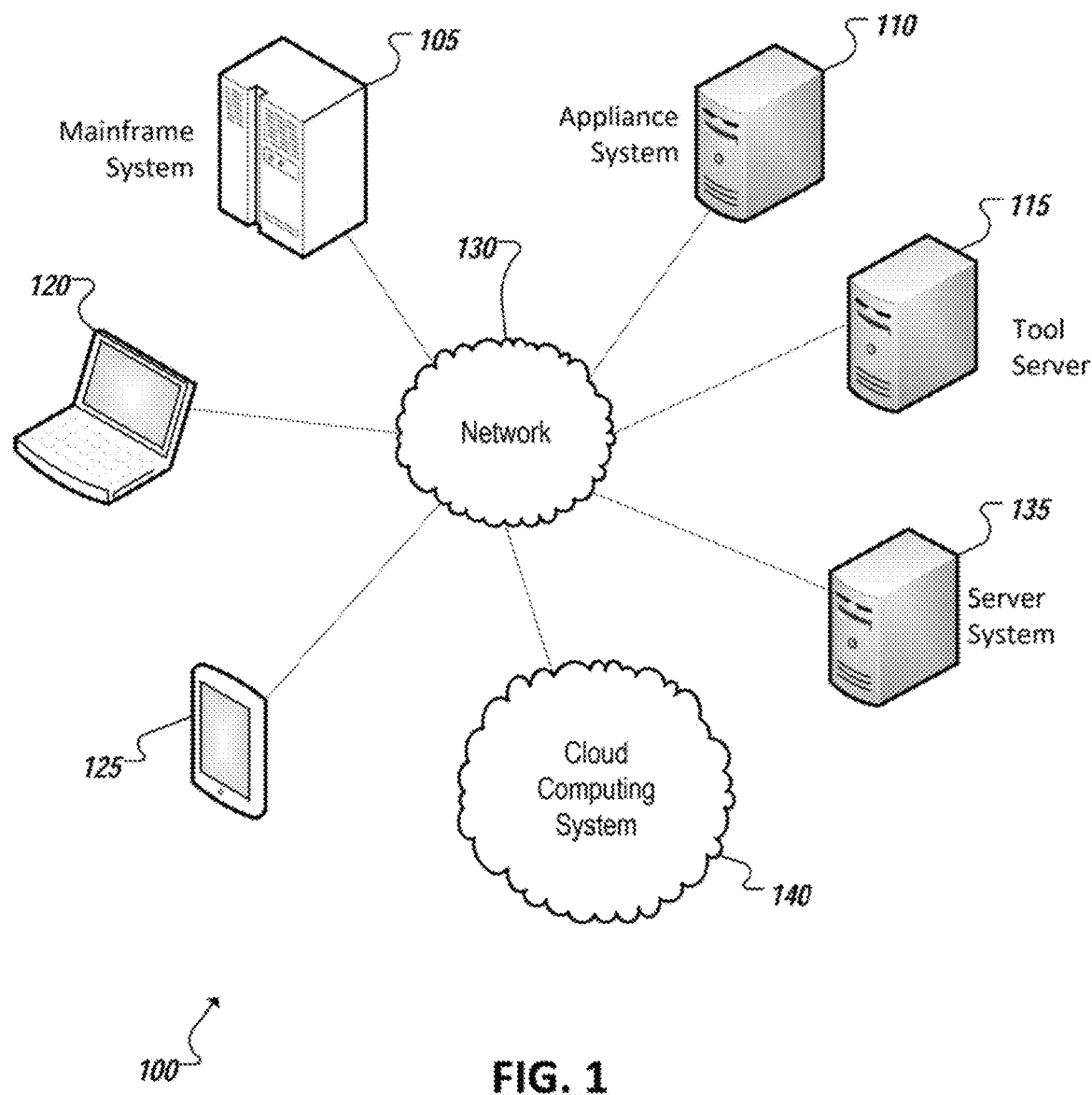
FIG. 1 illustrates a simplified schematic diagram of an example computing environment including an example appliance system.

As will be appreciated by one skilled in the art, aspects of the present disclosure may be illustrated and described herein in any of a number of patentable classes or contexts, including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or as a combination of software and hardware implementations, all of which may generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), or in a cloud computing environment, or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices, to produce a computer implemented process such that the instructions which execute on the computer or other programmable apparatus provide processes for implementing the functions/acts specified in the flowchart and/or block diagram block or blocks.

FIG. 1 illustrates a simplified schematic diagram of an example computing environment 100. In some embodiments, computing environment 100 may include functionality for hosting multiple interconnected software containers, each representing a distinct user-space or runtime instance. Components, such as particular diagnostic or data analytic tools, event handlers, or databases, may each be hosted in a respective one of these containers. A collection of these components may be defined and interconnected as an appliance, configured to perform certain functionality enabled by defined interactions and flows between components in the appliance. Such a container-based approach can simplify adoption and utilization of such an appliance, allowing the appliance to interface with and operate on data from a wide variety of systems and system types. For instance, an appliance may be defined for analyzing the performance of mainframe computing systems (e.g., 105) and may be implemented in a manner that is in compliance with the guidelines, policies, and preferences of administrators of the mainframe computing system 105. For instance, the container-based analytics compliance may itself be implemented on a mainframe computing system, and in some cases on the same mainframe computer that it is to monitor. Further, adoption and installation of a container-based analytics appliance may be configured for mainframe installations. For instance, an installation package may be provided that allows a container-based analytics package, not natively configured to operate on mainframe system operating environment, to be installed, administered, and updated using native or legacy mainframe tools and interfaces, among other example benefits.

In the example system illustrated in FIG. 1, an appliance system 110 may be provided to host and/or develop container-based data analytics appliances, which may be deployed on a variety of different types of host systems to analyze performance-related data of any one of a variety of different systems. In one example, an appliance system 110 may host an appliance manager capable of building a container-based software appliance composed of a collection of software containers each hosting a respective tool or microservice that is to implement various functionality of the appliance. In some implementations, A variety of different tools may be made available for use by an appliance system 105 in building various container-based appliances. In some implementations, the appliance system 110 may provide a platform whereon an appliance may be built, updated, and customized. For instance, a system controller and bus may be provided to allow microservices to be flexibly added, deleted, and/or exchanged to customize the particular functionality and data/transactional flows of the appliance. Indeed, in one example, a tool server 115 may be provided to host or otherwise provide access to a number of different tools. The tools may each provide some functionality that may be combined with functionality of other tools to realize a particular result. Some tools may further communicate and interoperate with backend systems supporting functionality of the tool (e.g., such as functionality requiring computing resources above and beyond what the software container may provide). In some cases, the tool server 115 may present a user interface to allow users designing an appliance to research and identify various tools that they may utilize and include an appliance to be designed by the user. In some implementations, the user interface may be or resemble a storefront, from which a user-designer may select a combination of tools and define interactions, transactions, or data flows between the tools, among other example implementations.

In some implementations, an appliance generated using an appliance system 110 (e.g., from software tools provided through one or more tool servers (e.g., 115)) may be implemented to perform analytics on data generated by another computing system. In some implementations, a system monitor external or internal (natively or added) to a subject system may monitor the system and report performance characteristics of the system, transactions attempted or completed using the system, and other attributes of the system. Such system data (e.g., generated by the system or by a system monitor) may be provided to an appliance generated or otherwise made available by the appliance system and hosted on a corresponding set of containers hosting tools implementing the appliance. The set of containers may be hosted on one or more computing systems. Computing systems for which data may be analyzed by such an appliance may include mainframe computing systems (e.g., 105), distributed computing systems, enterprise systems, servers, user devices, and Internet of Things (IoT) or other machine-to-machine (M2M) communication systems (e.g., composed of computing devices disposed in non-traditional environments (such as automobiles, household or industrial machines, wearable devices, etc.) and/or using other connected purpose-built or general purpose computing devices), among other example computing systems.

A system (e.g., 100) may further include one or more end-user devices (e.g., 120, 125), which may be utilized in some cases to allow a user to interface with and interact with various other systems and components of the computing environment 100. For example, developer-users may utilize end-user devices 120, 125 as terminals to manage the definition, deployment, installation, and/or administration of a software appliance to be launched and generated using an example appliance system 110. For instance, a user may interface with appliance system 110 and/or tool server 115 over a network 130 utilizing an end user device (e.g., 120, 125), such as a desktop, laptop, tablet, smartphone, or other computing device, to procure and/or design a package encapsulating data for use in installing a corresponding container-based appliance on a particular host system or individual microservice packages to add to an existing container-based appliance, among other examples. A user device (e.g., 120, 125) may be further used to interface with a system that is to host the container-based analytics appliance. For instance, user devices may serve as user terminals of a mainframe computing system to allow a user to access and use graphical user interfaces of the mainframe system to install the container-based analytics appliance and administer the appliance following installation. Indeed, the installation package can be configured such that a user comfortable with and accustomed to the particular interfaces and workflow of the mainframe system (e.g., 105) remains comfortable with the workflows involved in provisioning the appliance (which ultimately may be based on technologies (e.g., containers, host operating systems, etc.) that are foreign to many administrators specializing in mainframe system management. This may lower adoption barriers for such analytics appliances, including analytics appliance, which may be repackaged and deployed in containers hosted on a variety of different computing systems other than mainframe systems.

As noted above, a container-based analytics appliance may be flexibly deployed in a variety of different computing environments. In some instances, a user may desire to install and host a container-based analytics appliance on a server system (e.g., 135), such as an x86 system, as may be found in enterprise, distributed, and other networked systems. In still other examples, a container-based analytics appliance may be alternatively hosted in a cloud computing system (e.g., 140). Server- or cloud-based deployments of a container-based analytics appliance may still be capable of performing analytics for mainframe computing systems, however, in some instances, it may not be permissible or desirable to adopt such deployments. For instance, service level agreements, security policies, or other policies may dictate that data generated by a particular subject mainframe system, not be allowed to leave the system or be accessed or transferred to other systems that do not possess the same level of reliability or security, among other example issues. User experience may also serve as grounds for keeping tools, such as a container-based analytics appliance, used to support a mainframe system, hosted on the same or other mainframe system. For instance, traditional mainframe systems may utilize user interfaces, commands, and workflows which are unique to mainframes, and the users that manage or own these systems may have a particular affinity for or comfort level with these aspects of the mainframe system. Accordingly, adoption of tools for mainframe systems may be predicated on the tool supporting a user experience adapted to the users and administrators of such systems.

One or more networks 130 may be used to communicatively couple the components of computing environment 100, including, for example, local area networks, wide area networks, public networks, the Internet, cellular networks, Wi-Fi networks, short-range networks (e.g., Bluetooth or ZigBee), and/or any other wired or wireless communication medium. For example, an appliance system 110 may connect to and provide data to a host mainframe system (e.g., 105) for use in installing a container-based analytics appliance on the mainframe system, among other examples.

In general, elements of computing environment 100, such as "systems," "servers," "services," "hosts," "devices," "clients," "networks," "mainframes," "computers," and any components thereof (e.g., 105, 110, 115, 120, 125, 135, 140, etc.), may include electronic computing devices operable to receive, transmit, process, store, or manage data and information associated with computing environment 100. As used in this disclosure, the term "computer," "processor," "processor device," or "processing device" is intended to encompass any suitable processing device. For example, elements shown as single devices within computing environment 100 may be implemented using a plurality of computing devices and processors, such as server pools comprising multiple server computers. Further, any, all, or some of the computing devices may be adapted to execute any operating system, including Linux, other UNIX variants, Microsoft Windows, Windows Server, Mac OS, Apple iOS, Google Android, etc., as well as virtual machines adapted to virtualize execution of a particular operating system, including customized and/or proprietary operating systems.

Further, elements of computing environment 100 (e.g., 105, 110, 115, 120, 125, 135, 140, etc.) may each include one or more processors, computer-readable memory, and one or more interfaces, among other features and hardware. Servers may include any suitable software component or module, or computing device(s) capable of hosting and/or serving software applications and services, including distributed, enterprise, or cloud-based software applications, data, and services. For instance, in some implementations, an appliance system 110, tool server 115, and/or other sub-systems or components of computing environment 100, may be at least partially (or wholly) cloud-implemented, web-based, or distributed for remotely hosting, serving, or otherwise managing data, software services, and applications that interface, coordinate with, depend on, or are used by other components of computing environment 100. In some instances, elements of computing environment 100 may be implemented as some combination of components hosted on a common computing system, server, server pool, or cloud computing environment, and that share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
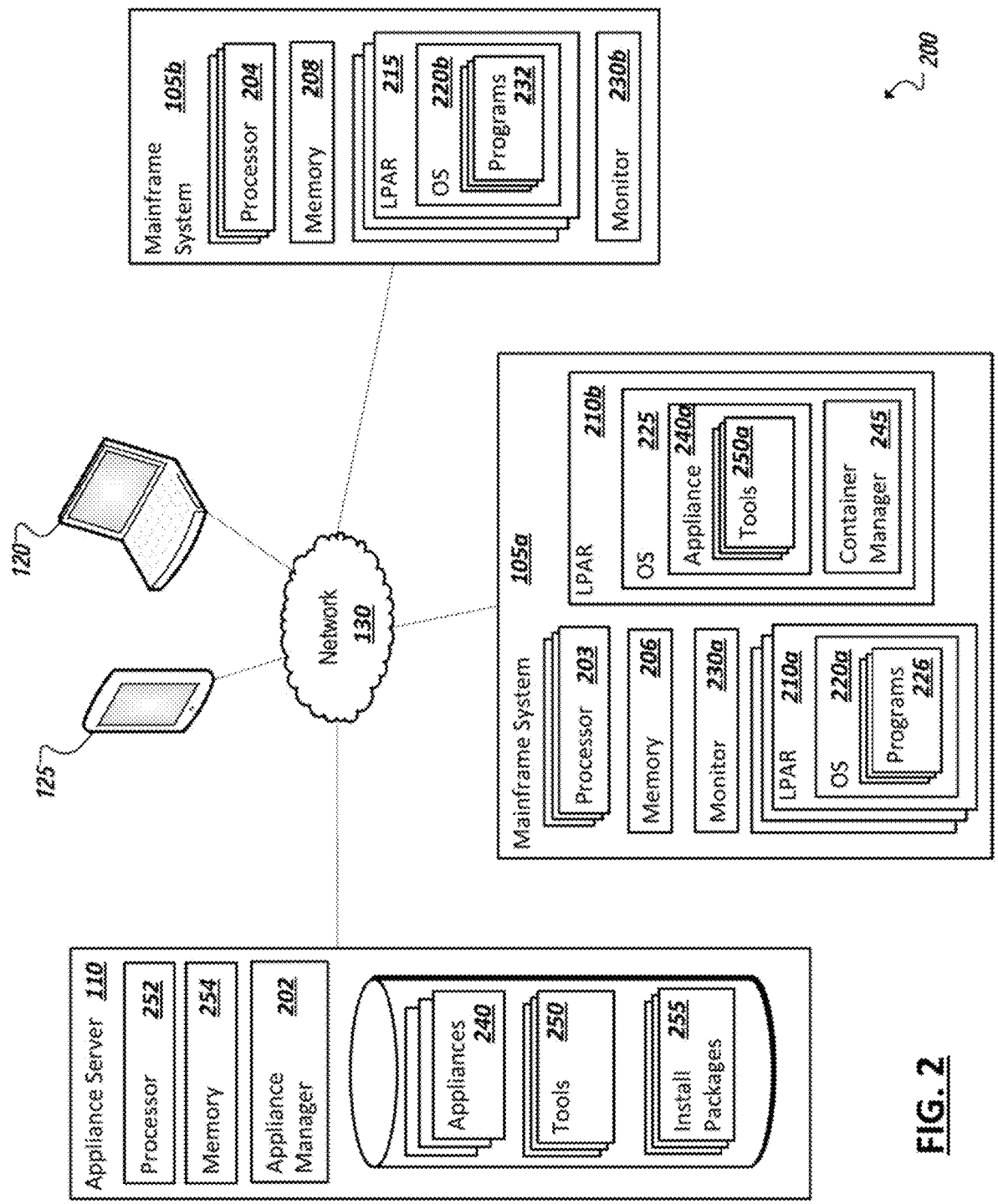
FIG. 2 illustrates a simplified block diagram of an example software system including an appliance manager installed on a mainframe computing system.

Turning to FIG. 2, a block diagram 200 is shown of an example system including an example appliance system 110 having an appliance manager 202 capable of generating container-based appliances (e.g., 140) that may be installed on and hosted at one or more host systems (e.g., 105a, 105b) (or the appliance system 110 itself) to provide diagnostics to one or more subject systems, such as a mainframe system 105 or other computing system. The appliance may be developed to be conveniently hosted on a system (e.g., 105a) trusted by the subject system (e.g., 105b) (or any other system capable of supporting containers and containerized software environments, including the subject system itself), and may advantageously address needs for diagnostic tools for custom, proprietary, or other systems for which diagnostic tools may be unavailable or insufficient.

In the example of FIG. 2, a container-based analytics appliance (e.g., 240a) is installed on an example mainframe system 105a. In one example, the appliance 240a may provide data analytics for data relating to another remote mainframe computing system (e.g., 105b). In another example, the appliance 240a may provide data analytics for the same mainframe computer 105a on which the appliance 240a is hosted (e.g., for data describing operation and performance of systems implemented on other logical partitions (LPARs) (e.g., 210a) as an LPAR 210b hosting the example appliance 240a. Mainframe computing systems may include one or more processor devices (e.g., 203, 204) and computer memory (e.g., 206, 208), including physical and/or virtual tape drives and other computer memory implemented using other memory technologies. A mainframe computing system 105a,b may effectively be subdivided into multiple mainframe computing systems on the same box, through LPARs (e.g., 210a, 210b, 215, etc.) defined on the system (e.g., 105a-b). An LPAR (e.g., 210a, 210b, 215, etc.) may represent a logical division of the processor, memory, and storage resources (e.g., 203, 204, 206, 208, etc.) of the mainframe system (e.g., 105a-b) that can be utilized independently with its own operating system (OS) instances (e.g., 220a, 220b, 225, etc.) and programs (e.g., 226, 232, etc.). Further, one or more regions can be included within a mainframe (e.g., 105a,b), each region forming a collection of mainframe resources controlled as a unit and used within the system to perform one or more tasks. Such resources can include, for example, programs, Basic Mapping Support (BM) map sets, transactions, terminals, files, transient data queues, temporary storage queues, among other examples.

An example mainframe computing system (e.g., 105a-b) that is to be the subject system of the operations of a container-based analytics appliance may be equipped with a system monitor utility (e.g., 230a-b), which may be used to monitor the functioning and performance of one of more segments (e.g., LPARs (e.g., 210a, 215) and the OSes (e.g., 220a-b) and programs (e.g., 226, 232) running on top of the LPAR(s)) of the subject system. For instance, a particular subset of the LPARs (e.g., 210a) of a mainframe computer (e.g., 105a) may be the designated subject of the monitoring (e.g., where other LPARs are left unmonitored or whose monitoring results are not designated for processing by a particular analytics appliance (e.g., 240a)). A monitor utility (e.g., 230a-b) may, in some instances, be instrumented and hosted on the subject mainframe (e.g. 105a-b), while in other implementations, the monitor utility (e.g., 230a-b) be hosted on an external system with an interface permitting a view within the subject system, among other example implementations. In one instance, the monitor utility (e.g., 230a-b) may monitor the performance, operations, and resource utilization and health of the mainframe. The monitor utility (e.g., 230a-b) may also include functionality to capture some of the data generated by the mainframe's subsystems and program (e.g., 220a-b, 226, 232, etc.), such that this data may also be considered in the analysis of the mainframe. The monitor utility (e.g., 230a-b) may be equipped with some analytics or diagnostic logic, such that the monitor utility (e.g., 230a-b) is capable of generating data that identifies events, alerts, and issues appearing within the system it monitors, among other example data identifying attributes of the mainframe system monitored by the monitor utility (e.g., 230a-b), among other examples.

In one example, a container-based analytics appliance (e.g., 240a) may be configured to receive data generated by one or more monitor utilities (e.g., 230a-b). Accordingly, in some implementations, a monitor utility may include an interface to send performance data directly to the appliance over a network connection. In instances where the monitor executes within one LPAR and the appliance (e.g., 240a) executes within a second, different LPAR (e.g., 210b), this may involve moving, in some cases, sensitive or protected data from or describing another LPAR (e.g., 210a) to the LPAR hosting the appliance (e.g., 240a). In other cases, the performance data may be stored, following generation, in a data store (e.g., hosted on a particular LPAR) and the container-based appliance (e.g., 240a) may be able to access the performance data from the data store for processing, among other example implementations.

In some implementations, a container-based appliance (e.g., 240a) or the containers and/or container manager (e.g., 245) enabling the microservices (e.g., 250a) of the container-based appliance (e.g., 240a) may be configured for operation on a particular operating system. In one example, a container software platform (corresponding to a particular container manager 245 and container images) may be designed for operation with the particular operation system (e.g., 225) based on the flexibility of the operating system, thereby allowing the container platform to be implement container-based solutions on potentially any host system that can run the particular operation system (e.g., 225). While version of such an operating system (e.g., 225) may be capable of being run on an LPAR (e.g., 210*b*) of a mainframe computing system, other operating systems (e.g., 220*a-b*) may be the more favored and adopted operating system of the mainframe computing system. The widespread adoption of such a mainframe-specific operating system (e.g., 220*a-b*), such as IBM's zOS operating system, may effectively make this operating system the default or standard for some mainframe systems, with other more customized solutions using more generalized operating systems (e.g., Linux-based operating system, Unix-based operating systems, Microsoft Windows-based operating systems, etc.) adapted for use on a variety of different system types, including mainframes. Accordingly, in one example, an LPAR 210*b* may be provided on which a generalized operating system 225 is to be run and support an installation of a particular container manager 245 associated with the container images utilized to implement the microservice tools (e.g., 250*a*) of the container-based appliance (e.g., 240*a*). Users tasked with ownership or administration of a mainframe computing system may possess less familiarity with the generalize operating system 225, its commands, interfaces, and functionality. Accordingly, in some implementations, an installation of the generalized operating system may be equipped with tools enabling the programs installed on the operating system 225 (including container manager 245 and the containerized microservices 250*a* implementing the appliance 240) to be automated, such that user familiarity with the operating system 225 or its programs (e.g., 245, 250*a*. etc.) is not required. Further, tools may be provided to allow a user to utilize GUIs and commands of a mainframe-specific OS (e.g., 220*a-b*) to perform the installation of a container based appliance (e.g., 240*a*) on a generalized OS (e.g., 225). These tools may further allow post-installation visibility into the container-based appliance (e.g., 240*a*) and management of the files making up the container-based appliance following installation using similar (or the same) GIs of the mainframe-specific OS, among other implementations.

A container-based analytics appliance may be built from a collection of interconnected microservices (or "tools") hosted on respective software containers managed and launched using a container manager system (e.g., 245). The container manager 245 may include logic to launch and configure a number of software containers (e.g., Docker containers, Open Container Initiative (OCI) based containers, and/or any other software container implementation), and corresponding tools and microservices, software images, databases, network connections, filesystems, runtime environments, and deployment environments that are to run on the containers, among other examples. Analogous to shipping containers, software containers may package a particular software component with all of its dependencies to ensure that it runs the same in any environment or infrastructure, out-of-the-box. For example, a software container may package everything required to run a particular software tool, such as the code, software libraries, configuration, files, runtime environment, and any other associated logic. Software containers may enable applications to be migrated across various infrastructures and environments without any modifications or environment-specific configurations. As a result, appliances instantiated using software containers may enable the appliances (e.g., through migration of its composite containers) to be migrated to or from local workstations, development servers, test environments, and/or production environments, etc. Software containers also enable individual tools to be developed using the best programming languages and technologies for each tools, without any internal conflicts from the requirements of different tools being combined together in a single appliance. Many inefficiencies of software development and deployment are eliminated with software containers, such as time spent configuring development and production environments, concerns about inconsistencies between development and production environments, and so forth. Software containers also avoid locking developers into any particular platform, software technology, and/or vendor. Software containers running on the same machine may also share a host operating system, thus avoiding the inefficiencies of virtual machines, which each require their own guest operating system on top of the host operating system. Accordingly, in comparison to virtual machines, software containers may launch faster and use less memory.

Software tools (e.g., 250*a*) implemented using software containers may be stored as container images on their respective host systems (e.g., 105*a* (and LPAR 210*b*)), which may include all components and dependencies required to run the corresponding particular software component in a software container. A container image, for example, may be a file format used to package the components and dependencies of a containerized software tool 250*a*. Container images may be constructed using layered filesystems that share common files, resulting in less disk storage and faster image downloads. In some cases, container images may be hosted by a software registry (e.g., appliance server 110) to provide a central repository for distributing container images (and their tools 250) to software developers.

An example a host system 105*a*/210*b* may support a container infrastructure including, for instance, an operating system and container engine to support the software containers implementing microservices 250*a* of the appliance 240*a*. Infrastructure includes the underlying hardware and/or software infrastructure used to provide the containerized environment, such as an application server. A container manager 245 may include software responsible for providing and managing the collection of containers, such as a Docker container engine, an OCI-based container engine, and/or any other type of software container engine. The container manager 245 may consume configuration files (e.g., a YAML-based file or other file detailing the number of containers, the requirements of each container (e.g., the particular resources each container is to be provisioned with to support the microservice logic that is to run on the container), and the microservice logic that is to be loaded on each container) to automate the launch of the appliance 240*a* composed of the containerized tools launched and managed by the container manager 245.

The containerized tools, or microservices, 250*a* of the appliance 240*a* may include a variety of different tools. One or more of the tools 250*a* may be configured to control messaging, interactions, or transactions between other tools 250*a* in the appliance 240*a*. For instance, a messaging or routing tool may be provided to assist in defining software-based communication channels between tools in the appliance 240 to facilitate routing of data between the tools. Indeed, the appliance 240*a* may rely on the processing of performance data (e.g., from a monitoring utility 230*a-b*) by multiple different tools 250*a* in the appliance according to a particular order. Further, in some implementations, an appliance 240*a* may facilitate multiple different transactions and data flows. For instance, different transactions, involving processing by different combinations of containerized tools 250*a* may be supported to process various types of performance data. Accordingly, one or more of the tools 250*a* of an example appliance 240*a* may include functionality for performing an initial inspection or analysis of the performance data to determine its context (e.g., the type of monitoring result described in the data, the particular subsystem described in the data, the attributes or event described in the data, etc.) and may determine the appropriate routing flows between tools 250*a* of the appliance to perform the processing adapted for performance data having this context, among other example features. The appliance 240*a* may generate results from the processing of performance data received from monitor utilities (e.g., 230*a-b*) on subject mainframe systems. These results may be stored, for instance, in a microservice tool of the appliance 240*a* implementing a results database. Such results may then be extracted or provided for use in generating GUIs, reports, and other presentations of the results to a user (e.g., through user computing device (e.g., 120, 125)) or for use and analysis by another system (e.g., an alert handler), among other examples.

As introduced above, containerized tools (e.g., 250) that may be included in a container-based analytics appliance may provide various functionality to enhance the capabilities of the appliance. For instance, examples of containerized tools may include categorization and classification tools, which may receive data and determine a context for the data. Such tools may be used, for instance, to determine an initial routing of the data within the appliance. For instance, based on the context of data, the data may be routed along one of potentially multiple alternative data/transaction paths within the appliance. Data paths may further include one or more tools that perform various data analytics tasks on data received by the appliance. An initial tool, such as a tool equipped with data classification or context determination logic may additionally augment received data to provide routing information with the data. In one example, an incoming quantum of data (e.g., a packet) capable of being processed by the appliance may be augmented by one of the tools to append a routing table to the data to record "hops" between tools and identify a next destination tool for the data (following processing of the data by another tool), among other example implementations.

An appliance may additionally include various data analytics tools, which may each be respectively equipped with logic to perform data analytics according various algorithms and techniques. For instance, some tools may apply various machine learning-based analytics techniques, some tools may apply other algorithms directly at the tool to generate one or more results, some tools may preprocess data and interface with a backend service to provide the preprocessed data to the backend service for processing (e.g., with the results of the backend service then received at the tool and re-packaged for processing by additional tools in the appliance), among other example tools. As examples, some tools may perform data analysis according to Kernel Density Estimates (KDE) or Western Electric Rules (and process data generated at relatively high rates). Other data analytics tools may include cluster detector tools to automatically infer topologic, hosting or other dependencies from data processed by the tool. Complimentary tools may also be provided (e.g., with a cluster detector tool), such as, in this example, another tool equipped to detect time separated recurrent events to establish causality between events identified using the cluster detector tool. In still other examples, machine learning algorithms may be employed within some of the containerized tools, such as tools employing machine learning regression, classification, and clustering algorithms, among other examples. Different tools may be used for different types of data arriving at the appliance. Other tools may be provided to generate alerts or actuate other services, tools, or systems in response to data analytics results generated by data analytic-type tools in the appliance. In some cases, actuator or alert tools may interface with systems external to the appliance and generate an alert, command, or other data for consumption by outside tools. In other instances, actuator or alert tools may provide or contribute to a user interface associated with the appliance to generate data for consumption by a user, among other examples. Still other tools may be selected and included in an appliance to provide a repository for results generated other tools (e.g., alert tools, analytics tools) provided in an appliance. Such tools may provide, for instance, databases or other structure data repositories. In some cases, a routing table appended to data processed by the appliance (and recording the routing hops between tools in the appliance) may likewise be stored for processing by other systems or tools in a repository provided through a repository tool in the appliance. Various types of repositories may be provided by various types of containerized tools included in the appliance, among other example implementations An example appliance server 110 may be provided to serve all or a portion of the data (e.g., container images, tool file data, configuration files, etc.) for use in installing a particular appliance on a host system (e.g., 105*a*). In one example, an appliance server 110 may include one or more processor apparatus (e.g., 252), one or more memory elements (e.g., 254), and components implemented using code stored on the memory elements 254 and executed by the processing apparatus 252, such as an example appliance manager 202. An example appliance manager 202 may be used to build and host container-based analytics appliances composed of tools hosted on a set of interconnected software containers (e.g., 250). A given tool may be composed of a container image and the microservice code that is to be run in the resulting container. Appliances 240 may be composed of a selection of multiple such tools and may represent predefined or prebuilt appliances. In some implementations, the appliance manager 202 may provide user interfaces through which customized appliances 240 may be built, through the selection of a particular combination of tools (e.g., 250) and the definition of interconnections between the tools, among other examples. In other implementations, a user may simply select a prebuilt implementation of an appliance, or may select a prebuilt appliance and customize the appliance design through the addition or deletion of tools and/or the definition of new or different interconnections between tools.

The appliance server 110 may further host or generate installation packages (e.g., 255) to encapsulate all of the data for use by a host environment to install a corresponding instance of an appliance (e.g., 240*a*) on the host (e.g., 105*a*/225). An example installation package 255 may be particularly configured for installation using installation commands of a mainframe-specific operating environment. For instance, an installation package configured for a generalized OS (e.g., 225) may be wrapped in an installation package of a mainframe-specific OS (e.g., 220*a*) to assist users familiar with the mainframe-specific OS to have confidence in the mechanics of installation of the appliance using the install package (e.g., 255). An installation package 255 may further include a configuration file for consumption by a container manager 245 to manage the launch of containers and their tools on the host. In some cases, the container images and microservice files (implementing the specific functionality of the tools) may also be included in the install package 255 provided to the host system by the appliance server 110. In other implementations, the relative large container image and microservice files may be provided separately, with a configuration file of the appliance (included in the install package 255) linking to external sources from which the container images and/or microservice files may be accessed and downloaded to complete installations using the container manager 245, among other examples.

Figure 3:
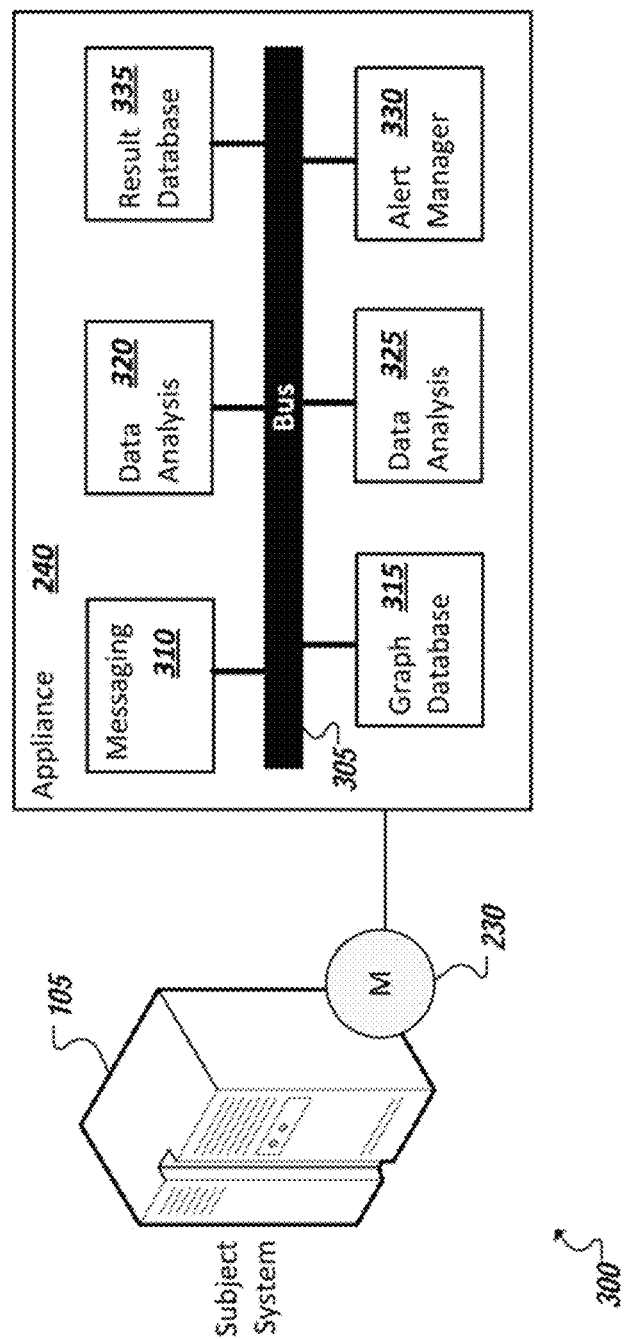
FIG. 3 illustrates a simplified block diagram of an example container-based software appliance.

Turning to FIG. 3, a simplified block diagram 300 is shown illustrating an example appliance 240 composed of a collection of containerized tools (e.g., 310, 315, 320, 325, 330) interfacing with an example subject system 105. In this example, the subject system 105 may be a mainframe system that includes a system monitor element 230 to collect and/or generate data from monitoring of the subject system 105 to describe performance attributes or results of transactions performed by the subject system 105. Data generated from the monitoring of the subject system 105 by the system monitor 230 (or "performance data") may be provided to an appliance 240 implemented using a network of containerized tools (e.g., 310, 315, 320, 325, 330). In some cases, data generated by the system monitor 230 may be stored in a data store and accessed by the appliance 240 for later processing. In other cases, the system monitor 230 may provide input data to the appliance 240 as it is generated by the system monitor 230 during monitoring of the subject system 105 (e.g., and thereby provide real-time analytics of the subject system's performance, etc.).

The appliance 240 may be built according to a reusable appliance template or framework, which may provide one or more standard tools and a software bus 305 to enable intercommunication between the containerized tools (e.g., 310, 315, 320, 325, 330). In one example, a messaging or controller tool 310 may be provided to organize and manage the network of interconnected tools implementing the appliance 240 and facilitate communications between the tools over the bus 305. A classification component (e.g., 315) may also be provided and may be designated as the first tool to inspect and/or otherwise process data as it is received at the appliance 240 (e.g., from system monitor 230). In one example, a graph database 315 or other tool capable of inspecting an incoming packet and determining a context or type of the packet may be provided. From this initial assessment of the packet, the graph database 315 may prepare the packet for further processing and may make an initial routing determination (e.g., based on applying a graph structure of the graph database tool 315 to the incoming packet) to cause the packet to be subsequently analyzed by one of the other tools in the appliance 240. For instance, the graph database tool 315 may determine that the packet is to be first routed to a first analytics tool 320 (rather than a second analytics tool 325). The first analytics tool 320 may process the packet and based on the results of the processing may conditionally route the packet along one of potentially multiple different data flow paths, among other example implementations. For instance, based on the results of one of the tools (e.g., data analytics tools 320), additional data may be sent to another containerized tool, such as alert manager 330. For instance, if a data analytics tool 320 assesses performance data and identifies an anomaly or other issue from the data, the data analytics tool 320 may send a message describing the issue (over bus 305) to an alert manager tool 330. The alert manager tool 330, in this example, may include logic to determine whether this latest issue, identified by the data analytics tools 320, qualifies as or substantiates an alert condition to be defined and communicated using the alert manager tool 330 (e.g., through alert data generated by the alert manager tool 330), among other examples. A final result may be generated, in some examples, and routed to a repository tool, such as a database tool 335 hosted in another one of the containers of the appliance 240. The subject system 105 or another system (e.g., a system used to administer or otherwise manage the subject system 105) may then access these results from the repository (e.g., of database tool 335), among other example implementations.

Figure 4:
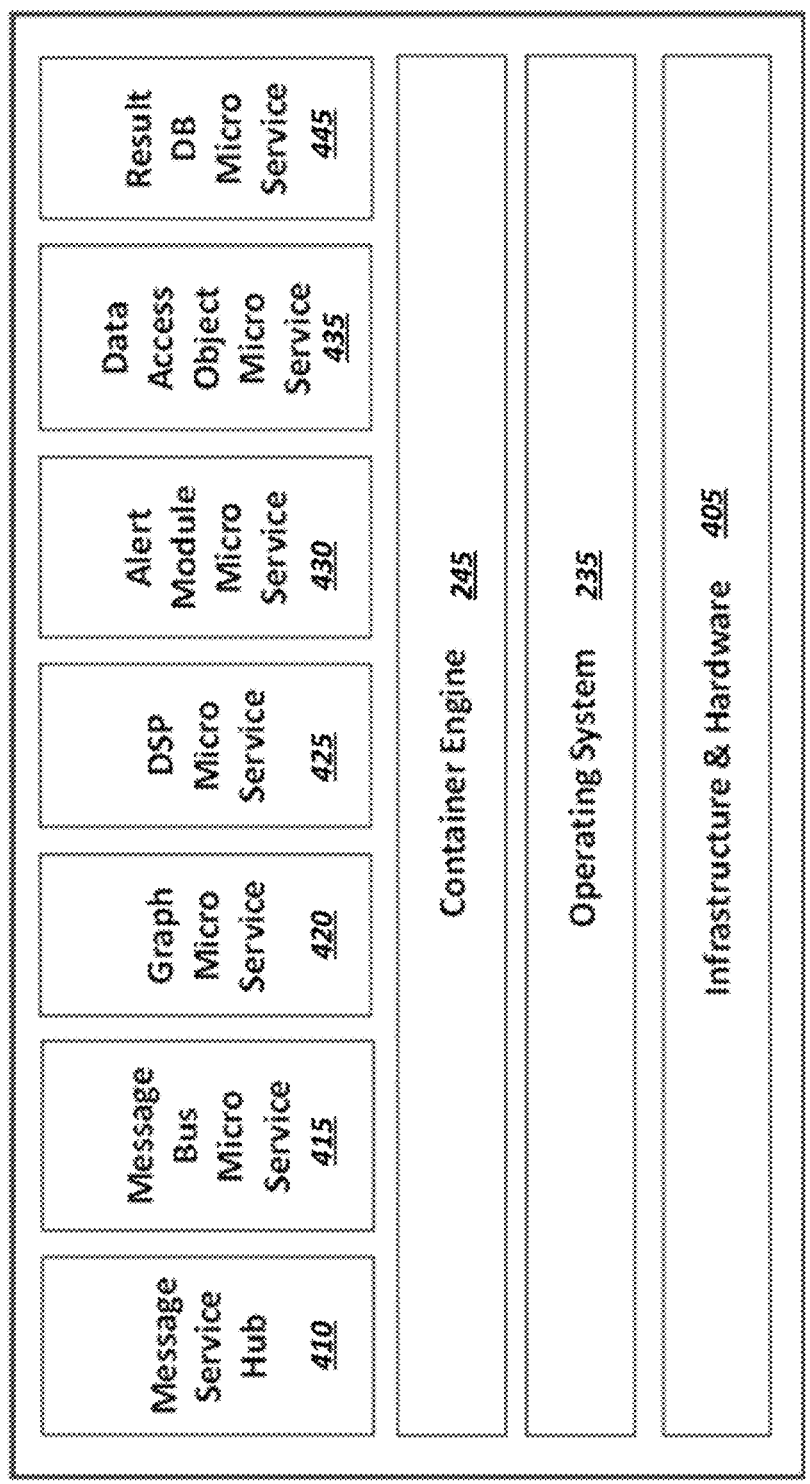
FIG. 4 illustrates a simplified block diagram of another example container-based software appliance.

Turning to the example shown in the simplified block diagram 400 of FIG. 4, another example illustration of a container-based analytics appliance is shown. As illustrated, the microservice tools (e.g., 410, 415, 420, 425, 430, 435, 445) provided to implement the data analytics appliance may be built upon a stack that includes a container engine 245, operating system 235, and the host infrastructure and hardware 405 (such as the particular infrastructure and hardware provided in connection with the LPAR on which the operating system 235 is hosted). The container engine 245 may be compatible with the operating system 235 and manage the deployment of each of the containerized tools (e.g., 410, 415, 420, 425, 430, 435, 445) provided to implement the appliance. In one example, a message service hub tool 410 may be provided to collect and consolidate message traffic from multiple LPARs of a subject mainframe system into a discrete number of topics to be consumed by the appliance. A message bus microservice 415 may also be provided to implement a software bus of the appliance and enable intercommunication (over the bus) between other tools (e.g., 410, 420, 425, 430, 435, 445) in the appliance. The software bus itself may be implemented as a set of microservices (e.g., an odd number (e.g., 3 or 5) of messaging microservices. The data analytics appliance may additionally include a graph microservice 420, which may implement a graph structure and/or graph database, which may be used to categorize, classify, or determine the context of the various data arriving (from a monitor of a subject mainframe) at the appliance for processing.

Some of the microservices provided within the appliance may provide the infrastructure over which messaging between tools, routing of data, and storage of processing rules are facilitated. Other microservice tools of the appliance may provide the substantive data analytics functionality of the appliance. As an example, one or more data science processing (DSP) data analytics tools (e.g., 425), which may apply various data science algorithms, including machine learning models and techniques, to data accessed by the appliance for processing. Multiple different DSP microservices (e.g., 425) included within the appliance may encapsulate the functionality of various different data analytics techniques. Depending on the context of the data, a select subset of the provided data analytics functions (e.g., provided potentially by different distinct microservices in the appliance) may be applied, such that the data is selectively routed to these or a combination of these tools for analysis. In some implementations, a chain or tree of data analytics nodes (implemented using corresponding DSP tools (e.g., 425)) may be provided, such that results from one data analytics tool may be fed to other data analytics tools (e.g., depending on the results of the preceding processing) for additional processing.

Further, data flows and transactions defined and enabled within an appliance may cause results of a data analytics tool to be potentially fed to other tools, such as an example alert module microservice 435. In some implementations, data analytics tools 425 may be provided to apply data science algorithms to performance data to identify patterns, anomalies, predictions, and events (e.g., not otherwise identified by the monitoring utilities generating the performance data). However, not all anomalies, errors, or other events detected using one or more DSP microservice tools (e.g., 425) may necessitate a corresponding action or alert. For instance, the alert module microservice tool 430 may be equipped with logic to track or aggregate events and issues detected (and reported to the alert module microservice tool 430 over the appliance bus) and determine whether the reported events violate one or more policies, such as by exceeding a corresponding threshold or limit (e.g., events reported at a frequency beyond a statistical or numerical threshold (e.g., anomalies appearing in an unacceptably high percentage of transactions or beyond an acceptable rate, etc.)). The alert module microservice 430 may be further equipped with logic to generate alert data to report when a policy or rule has been violated, or when an alert condition is otherwise evidenced by results reported by one or more DSP analytics tools (e.g., 425). In some instances, results of DSP analytics tools (e.g., 425) may only be routed to an alert module tool 430, when the DEP analytics tool (or another tool provided to oversee transaction routing within the appliance) identifies that the results contain information relevant to the alert module. For instance, result data indicating normal operating conditions generated by an example DSP analytics tool (e.g., 425) may not be routed to the alert module tool 430 (and may instead be routed directly to database tools (e.g., 445) to store the result data.

In some implementations, a data access object microservice 435 may be provided to act as a shim or data marshal to provide database access within the appliance, such that other microservices requesting database access interact with this microservice 435 to minimize the need for similar functionality to be reproduced across multiple microservices. Further, as introduced above, an example appliance may additionally be equipped with database microservices (e.g., 445), which may be utilized to record the operation and results of processing of the appliance (and its composite tools). In one example, the result database microservice 445 may store time series (e.g., time, key, and value) data for the metrics derived using other tools in the appliance. The basic structure is time, key and value. Additional databases may be included (e.g., in a graph database encapsulated within graph microservice 420) to provide relationships of the metrics in the time series, such that these relationships may be powerfully applied at the model level and at the instance level. It is a very powerful concept.

Turning to the example of FIG. 5, a simplified block diagram 500 is shown illustrating an example installation package for an appliance, adapted to facilitate automated installation of the appliance on a mainframe computing system. In one example, the code 505 implementing a particular microservice tool may be provided and developed utilizing any one of a variety of different programming languages and utilizing technology corresponding to the desired functionality of the microservice tool. For instance, the code 505 may be implemented in Java, C++, Python, etc. and may be embodied in one or more files (e.g., Java Archive (JAR) files, etc.). A container image 510 may be provided in which the microservice code 505 is to execute. The container image 510 may be based on a base container image, augmented (e.g., in accordance with the dependencies or requirements of the microservice code 505) to provide the computing resources to support the execution of the microservice. A respective container image 510 may be provided for each one of the containerized microservice tools to be included in a given analytics appliance. Container images may be an inert, immutable, file that represents a container to be created (using a corresponding container manager or engine). The images may be used by the container engine to produce the corresponding container when started with a run (e.g., using a build command). In one example implementation, the container images may be Docker container images, OCI container images, among other examples.

Figure 5A:
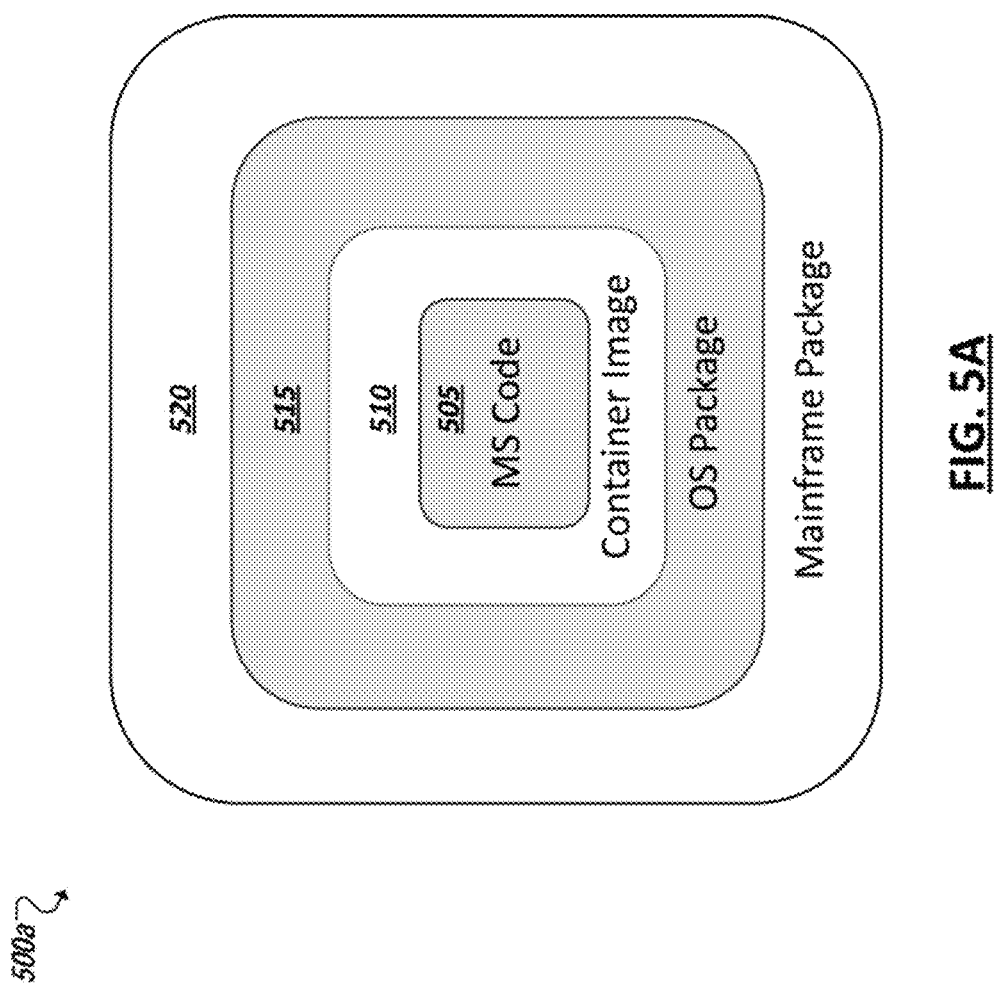
FIG. 5A illustrates a simplified block diagram illustrating an example installation package for a container-based software appliance.

In one example, such as illustrated in FIG. 5A, each of the container images 510 and microservice code 505 corresponding to each one of the microservice tools that is to be included in a particular appliance, may be respectively wrapped in a corresponding package file 515 corresponding to a package manager of a particular (e.g., generalized) operating system. The package manager may be equipped with logic to extract the files contained within the package and install the files according to the particular operating system. The package manager may facilitate the automated installation of the packaged files on the host system. In one example implementation, the package files wrapping each of the container images 510 and microservice files 505 may be a Red Hat Package Manager (RPM) file for use by a package manager of a Linux-based operating system (e.g., a Linux on z Systems OS). To allow the installation of the appliance to be facilitated using GUIs, tools, and commands of a mainframe-specific operating system (e.g., zOS), the collection of OS package files 515 may be collectively wrapped in one or more system modification packages 520 of the mainframe-specific operating system. In one example, the system modification package 520 may be a System Modification Program/Extended (SMP/E) program temporary fix (PTF) file or other system modification file utilized in an example zOS mainframe-specific OS. In some cases, the multiple OS package files 515 of the multiple tools to be used to create the appliance may be wrapped in a single system modification package 520 and may be transferred to the host mainframe system (that is to provide the LPAR on which the appliance is to be installed) as a single file. In other instances, the aggregate size of the multiple container images 510 and microservice code 505 may not allow (or be undesirable) to wrap in a single system modification package 520. Accordingly, in such instances, the OS files 515 of the multiple appliance tools may be alternatively wrapped in two or more system modification packages 520, among other example implementations.

Figure 5B:
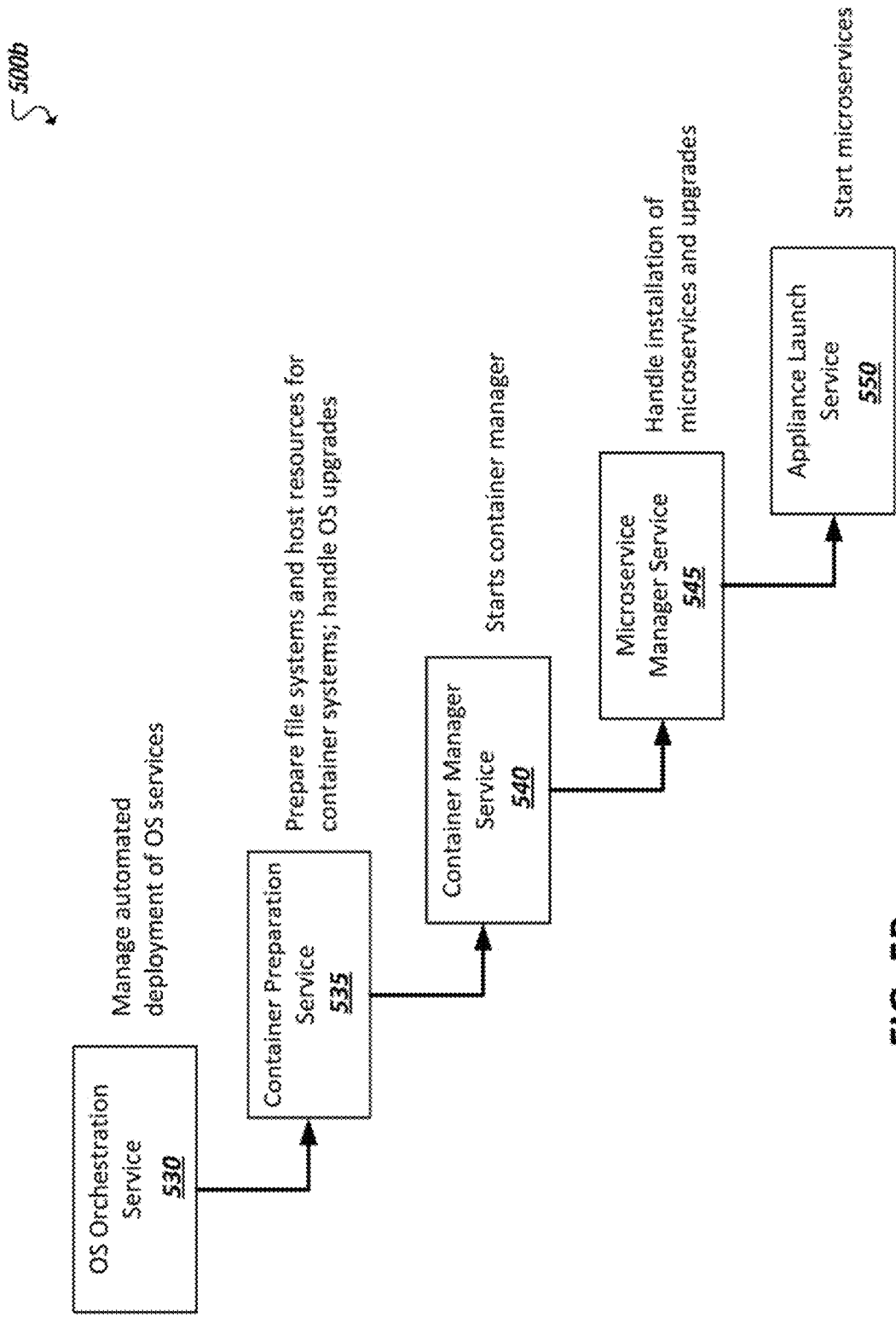
FIG. 5B illustrates a simplified flow diagram of operating system services used in the orchestration of an example container-based software appliance.

Turning to FIG. 5B, an example flowchart is illustrated to show example services that may be provided in an example OS adapted for automating the deployment of a container-based analytics appliance on a mainframe computer. In one example, an OS adapted for use with a particular container technology and container manager, may be augmented with one or more services to automate the orchestration and launch of an appliance on a corresponding LPAR of the host mainframe computer. For example, an orchestration service of the generalized OS (such as a System service of a Linux-based OS) may be configured to launch, upon startup of the LPAR and OS designated to host the appliance, a container preparation service 535. The container preparation service 535 may be configured to perform a check of the resources of the OS to determine whether the requisite file systems and host resources needed for a particular container manager are available on the LPAR and/or OS. The container preparation service 535 may prepare file systems (e.g., adjusting the sizes, names, and number of file systems) and host resources to be used by the container manager, should they not already be properly configured at launch of the OS.

Further, the container preparation service 535 may also check for and perform updates of the OS that it determines are needed or desired for the particular container service, among other actions to prepare the system for the launch of the container service. The orchestration service 530, in one example, may provide an amount of time for the container preparation service 535 to complete actions to prepare the system for the launch of the particular container manager, and the orchestration service 530 may be further configured to condition the launch of a subsequent service (e.g., 540) for launching the container manager upon the container preparation service 535 returning a confirmation message indicating that the requisite file systems and host resources have been appropriately prepared. Should the container preparation service 535 fail for any reason to return the confirmation message (e.g., within the time set by the orchestration service 530), the orchestration service 530 may halt the launch of the particular container manager (and thereby the container-based appliance) and may, in some cases, recall the container preparation service to attempt again to verify that the system is prepared for the particular manager.

Continuing with the example of FIG. 5B, if the container preparation service returns a confirmation message or status, the orchestration service 530 may call a container manager service 540 in response. The container manager service 540 may cause the particular container manager to be started. This sequence (e.g., 530, 535, 540) may allow a container manager to be launched automatically on a generalized OS hosted on a mainframe computing system, without requiring any additional input by the user (who may lack experience or comfort with the generalized OS, the container manager, and other aspects that fall outside of traditional mainframe tools and systems. The container manager service 540 may verify the launch of the particular container manager and the orchestration service 530, in response, may launch a microservice manager service 545 configured to automatically handle installation of microservices of the appliance on the host following the start of the container manager.

While the container manager may be the component that handles the creation and loading of the containers that are to implement the collection of tools embodying the appliance, the microservice manager service 545 may check that the proper microservice files are present and up-to-date and handle any installations or updates of the microservice files should that microservice manager service 545 determine that the requisite microservice files of the appliance are not present. The microservice manager service 545 can effectively check that the configuration files, microservice files, and container image files are available and up-to-date, before the particular container manager acts to create and launch the containers and their microservices from this data. Upon determining that the requisite artifacts are in place to implement the appliance, the microservice manager service 545 may return a confirmation message, which causes the orchestration service 530 to identify the next service defined for use in automating the orchestration of the appliance on a mainframe (or potentially other) host system. For instance, an appliance launch service 550 may be called in response to the microservice manager service returning a confirmation message, with the appliance launch service 550 responsibility for automating the launch and instantiation of the containers and their respective microservices to implement the appliance.

In some implementations, an installation package (such as discussed in the example of FIG. 5A) may include all of the data and code that is to be used to install a container-based analytics appliance on a host mainframe system. In some instances, a portion of the code, in particular one or more container images and/or one or more microservice code files, may be withheld from an installation package and may be made available for download from an external source. For instance, as illustrated in the simplified block diagram of FIG. 6, an appliance system 110 may host install packages, including installations packages wrapped in an outer system modification package of an example mainframe-specific OS. In one example, an install package 250a may be sent from the appliance system, over a network, to a host mainframe system 105. In this particular example, the install package 250a may include a mainframe-specific system modification package 520 wrapping a package 515 configured for a second different OS 225 that is to host a container manager 245 on the host mainframe 105. Multiple OS packages 515 may be provided, one for each of the container-based tools (e.g., 250) that is to implement an appliance 240. One or more of these packages (e.g., 515), instead of including both the container image and microservice code of the corresponding microservice tool, may instead only include the corresponding configuration file 605 (e.g., a YAML file describing the implementation of the container and its respective tool), which may include a link or instructions to access the corresponding container image and/or microservice code from an external source (e.g., secure data store 610).

Figure 6:
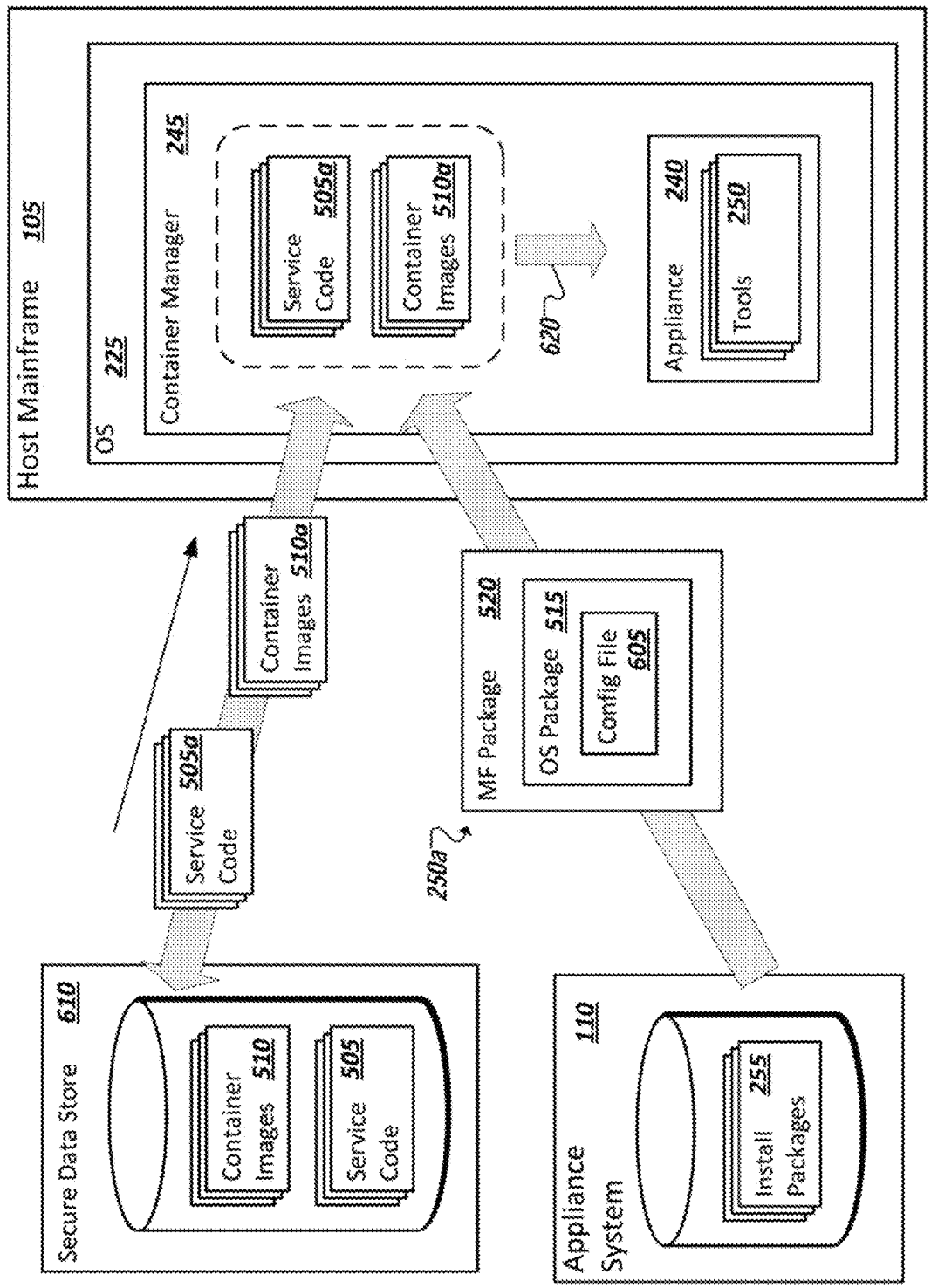
FIG. 6 illustrates a simplified block diagram representing an example installation of a container-based software appliance on a mainframe computing system.

In the particular example of FIG. 6, the container manager 245 (or another tool of operating system 225) may consume the configuration file 605 to determine that the service code and container images of one or more (or even all) of the appliance's tools are not in the install package 250a, but are instead to be accessed and downloaded from one or more external sources (e.g., 610). The host 105 may then communication (e.g., over a secured network connection facilitated by the security tools resident on the mainframe system 105) with an external source. In this case, the external source is a secure data store 610 (e.g., in keeping with data security requirements of an example mainframe system host (e.g., 105)) storing container images (e.g., 510) and/or microservice code (e.g., 505), which may be requested for inclusion in appliances by an example container manager 245. In one example, the container manager 245, the OS 225, or another component of the mainframe host 105 may perform an authorization of the secure data store, to confirm its trustworthiness (or the secure data store 610 may be previously negotiated and agreed upon between the appliance system 100 and host mainframe 105, or the links included in install packages received from the appliance system 110 may be implicitly trusted due to an existing trust relationship between the appliance system 110 and host system 105, among other examples). The container manager 245 may send a request for the container (e.g., 510a) images and/or service code (e.g., 505a) identified in the configuration file 605 and the secure data store 610 may send the requested container images (e.g., 510a) and/or microservice code (e.g., 505a) to the requesting host 105. The received artifacts (e.g., 505a, 510a) may then be accessed by the container manager (or another component, such as an example microservice manager service (e.g., 545 in FIG. 5) to build the corresponding microservice tools (e.g., 250) and launch (at 620) the appliance 240.

Figure 7:
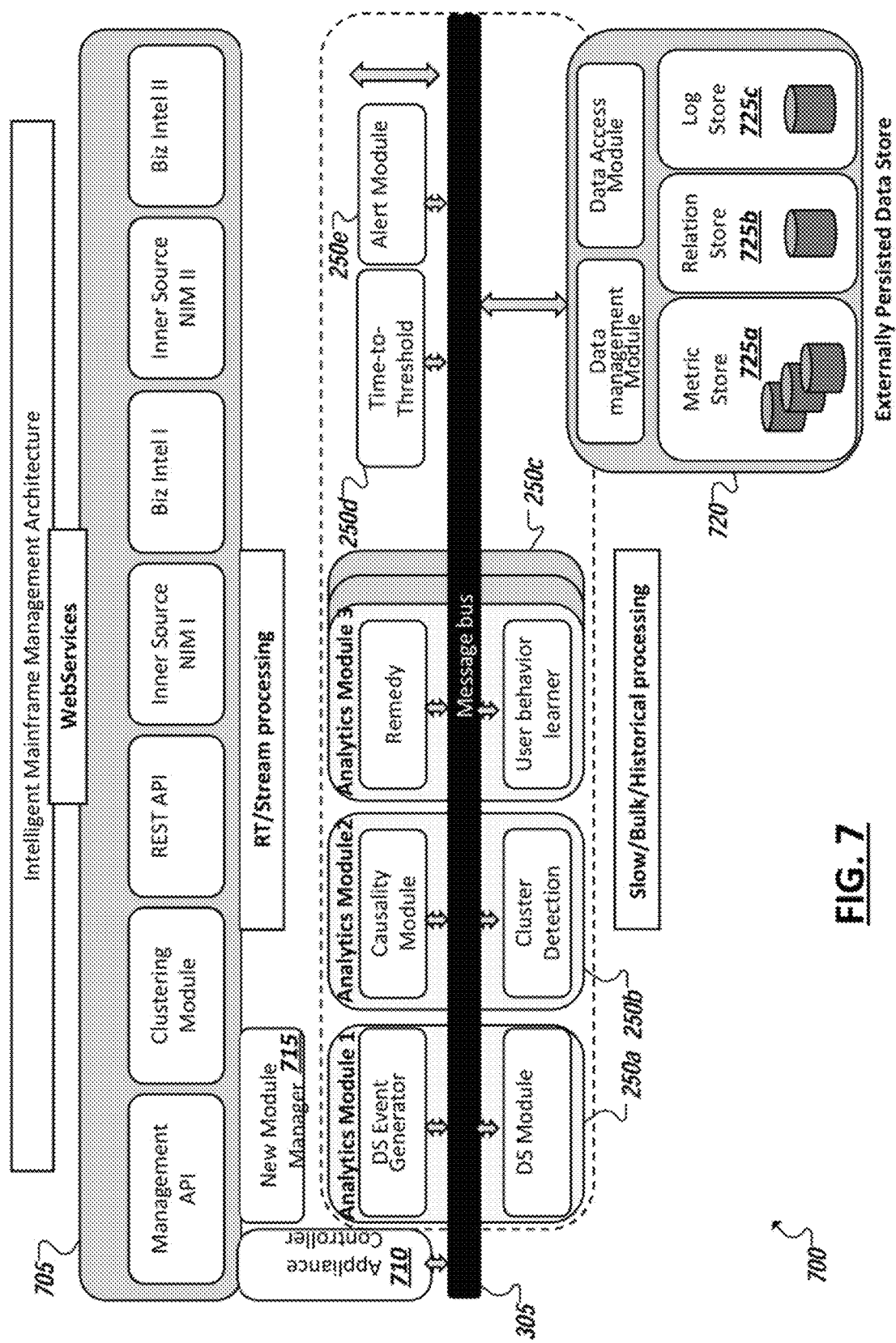
FIG. 7 illustrates a simplified block diagram of another example container-based software appliance.

Turning to the simplified block diagram 700 of FIG. 7, another example implementation of an analytics appliance is shown. In this example, an appliance platform is shown, which may permit customization, updating, and expansion of the collection of microservice tools used to implement the appliance. For instance, a variety of different data analytics tools (e.g., 250a-c) are shown including, as examples, a data science event generator analytics tool 250a, a causality and cluster detection tool 250b, and user behavior learning module 250c, which may communicate with each other and other containerized tools (e.g., 250a-e) connected to a messaging bus 305 provided for the platform. Other tools may include alert tools, such as a time-to-threshold tool 250d to provide alert decluttering among other potential functionality.

Additional utilities may be provided to support the appliance platform. For instance, web services 705 may be provided to implement API driven interfaces and driven through user interaction. Web services 705 may include such interfaces such as a representational state transfer (REST) API, a management API, clustering API, business intelligence interfaces, etc. An appliance controller 710 may be a containerized tool implementing a system controller within the appliance to handle the management of tools within the appliance. A new module manager 715 may interoperate with the appliance controller 710 to handle introduction and interconnection of new tools to the appliance. A real time stream processing layer 730 may represent the speed layer of the appliance and handle data streamed to the appliance from various LPARs of a subject mainframe for immediate or real time processing. An externally persisted data store 720 may be provided for dedicated use by the appliance and may represent various databases implemented by database microservice tools such as a results database metric store 725a, graph database relation store 725b, log store 725c, etc.

Figure 8:
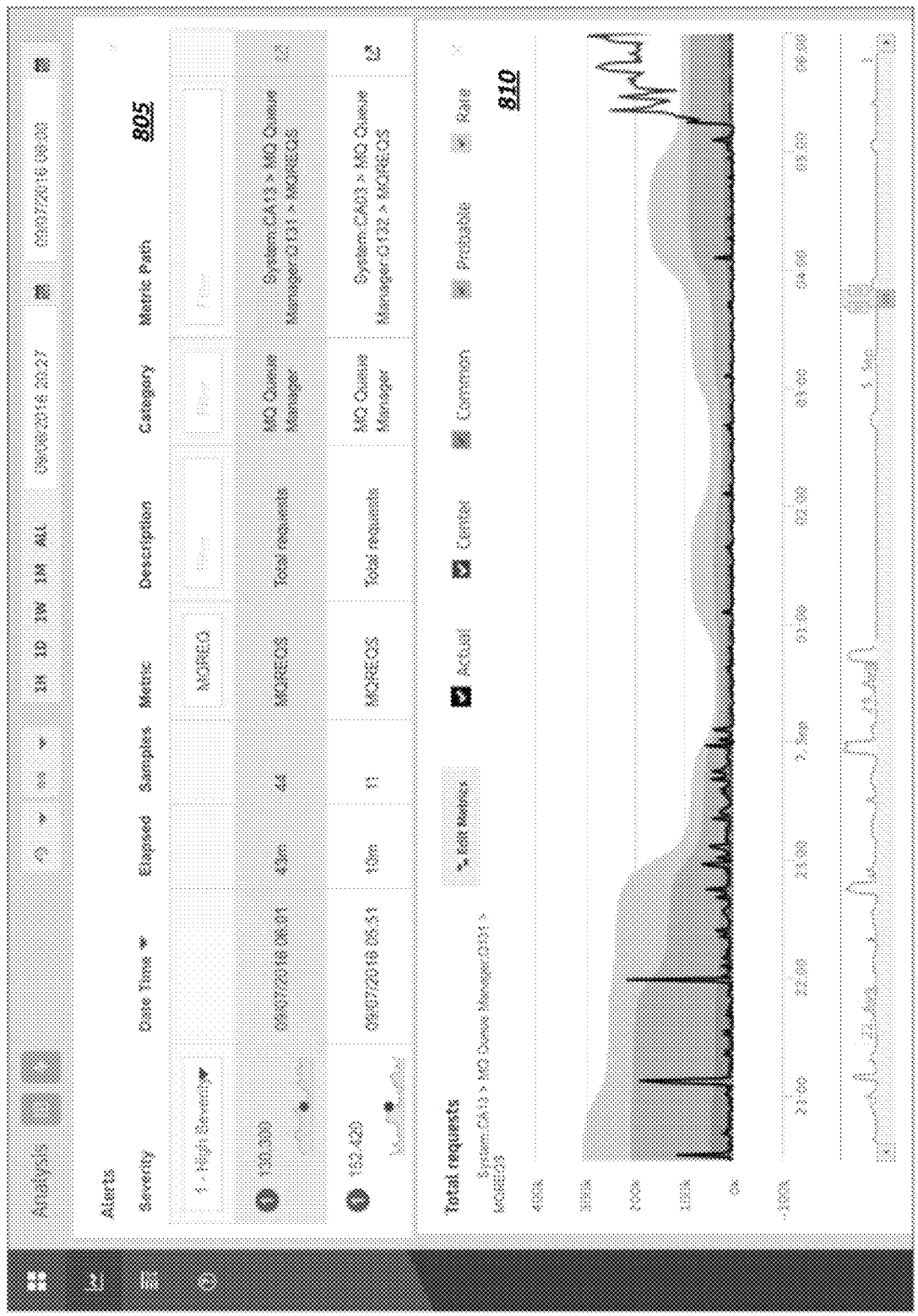
FIG. 8 illustrates a screenshot of an example graphical user interface presentation corresponding to an example container-based analytics appliance.

In some implementations, an analytics appliance may additionally provide a tool (or may provide result data usable by an external tool) to generate GUI presentations representing the data analytics and alert results generated by appliance for various types of data representing various aspects of a subject mainframe system. FIG. 8 provides an example screenshot of an example GUI presentation generated from the results of performance data processing by a container-based analytics appliance, such as discussed above. In this particular example, a first window 805 may be provided to display, in summary form, alert events detected (e.g., using one or more alert manager tools of the appliance), which a user may select or otherwise interact with to have additional, more detailed information displayed concerning the corresponding alerts. In this example, an additional window (e.g., 810) may be provided to display a summary of information reported based on results of a data science tool's processing of performance data from an example mainframe computing system. Additionally GUIs may also be provided, at least some of which are operable with and/or provided through mainframe-specific OS tools or standards. In one example, a user may manage and inspect performance of the appliance itself through one or more GUIs, and may implement changes (e.g., through a zOS GUI in order to cause automated changes to be made according to a different OS (e.g., Linux) hosting the appliance, among other examples.

FIGS. 9A-9B are flowcharts 900a-b showing example techniques involving an example appliance to be composed of multiple interconnected container-based tools, including appliances adopting one or more of the features and principles discussed in the foregoing. In the example of FIG. 9A, a container-based analytics (or analysis) appliance is launched 905 on a first mainframe system. The first mainframe system may be a first LPAR of a physical mainframe computer. Data may be received 910, such as performance data generated by a monitoring utility, describing performance of a different second mainframe system on a separate, second LPAR (e.g., an LPAR of a physical mainframe computer separate from or the same as the computer hosting the first LPAR). The data may be routed 915, within the appliance, to a data analytics microservice tool, which may analyze 920 the data to determine a result. In some examples, the nature of the result generated from the analysis 920 may cause one or more additional microservice tools in the appliance to process data corresponding to the data receiver (at 910) from the second mainframe computing system. For instance, based on the result, it may be determined 925 whether to route the result of the data analytics microservice to an alert manager microservice tool, among other example tools. Results of the processing by one or a combination of the microservice tools may then be sent 930 for storage in one or more databases implemented using additional microservices within the appliance, among other example implementations.

Turning to the example of FIG. 9B, launching of a container-based analysis appliance (e.g., 905 in the example of FIG. 9A) may include launching 950 an initialization service of an operating system (OS) that is configured to host a particular container manager on a first mainframe system. The initialization service may automate the calling of one or more additional OS-level services, which may be utilized to automate the orchestration and launch of a container-based appliance, and thereby simplify the adoption of such analytics tools on a mainframe computing system. For instance, OS resources and filesystems may be checked 955 to determine whether the requisite resources are in place and appropriately configured to support a particular container manager. A service (e.g., launched by the initialization service) may even identify deficiencies in the host system and perform automated updating and reconfiguration of system resources (or the OS itself) in order to satisfy requirements or desired settings of the particular container manager.

When it has been determined that a host system is provisioned with the resources supporting an example container manager, the container manager may be started 960 (e.g., based on a confirmation message returned by a service responsible for checking 955 the system for support of the container manager). With the container manager started, an additional service may be invoked, in some examples, to automate a checking process to determine whether the microservice files and container images designated for use in implementing the appliance are available on the host. With the container images and microservice files available, the appliance may be launched and run 970, with the appliance being constructed (e.g., by the particular container manager) through the building of each of the composite containerized microservice tools defined for the appliance. Data may then be received (e.g., 910) from a second mainframe system, which the running appliance may process to generate additional results and insights, among other example features and functionality. In some implementations, the automated orchestration of the launch (e.g., 905) of a container-based analytics appliance in a host mainframe system (such as described in the example of FIG. 9B) may involve a specialized install package including packages (compatible with the container-manager-hosting OS) for each of the composite microservice tools of the appliance, wrapped in an additional system modification package of a different, mainframe-specific OS environment, among other examples.

It should be appreciated that the flowcharts and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as suited to the particular use contemplated.

The invention claimed is:

1. A method comprising:
receiving data describing performance attributes of a first mainframe computing system at a software appliance, wherein the software appliance is hosted at least in part on a second mainframe computing system and the software appliance comprises a plurality of microservices hosted in a plurality of software containers, wherein each of the software containers comprises a respective, separate runtime instance;
sending the data to a first one of the plurality of microservices hosted in a first one of the plurality of software containers, wherein the first microservice comprises data science logic;
analyzing the data using the data science logic to generate a result at the first microservice, wherein the result indicates whether the data indicates an anomaly involving the first mainframe computing system; and
determining whether to send the result to a second one of the plurality of microservices hosted in a second one of the plurality of software containers based on whether the result indicates an anomaly involving the first mainframe computing system, wherein the second microservice comprises logic to determine an alert condition based on results received from other microservices in the software appliance.

2. The method of claim 1, wherein the data is received from a monitor resident on the first mainframe computing system and monitoring performance characteristics of the first mainframe computing system.

3. The method of claim 1, wherein the first mainframe computing system comprises a first logical partition (LPAR) of a particular mainframe computer and the second mainframe computing system comprises a second LPAR of the particular mainframe computer.

4. The method of claim 1, wherein the data comprises data generated from an application hosted on a particular LPAR of the first mainframe computing system.

5. The method of claim 1, wherein the plurality of microservices comprise a plurality of data analytics microservices comprising the first microservice.

6. The method of claim 5, wherein the plurality of microservices comprise a third microservice comprising logic to determine routing of the data to one of the plurality of data analytic microservices.

7. The method of claim 1, wherein the plurality of microservices comprises a third microservice to determine a context of the data, and the data is to be routed to particular microservices in the plurality of microservices based on the context.

8. The method of claim 7, wherein the third microservice comprises a graph data structure and the graph data structure is to be applied to the data to determine the context.

9. The method of claim 8, wherein the third microservice comprises a graph database microservice.

10. The method of claim 1, wherein the plurality of microservices comprises a third microservice comprising a database to stores results related to processing of the data by the appliance.

11. The method of claim 1, wherein the data science logic comprises a machine learning algorithm.

12. A computer program product comprising a computer readable storage medium comprising computer readable program code embodied therewith, the computer readable program code comprising:
computer readable program code configured to receive data describing performance attributes of a first mainframe computing system at a software appliance, wherein the software appliance is hosted at least in part on a second mainframe computing system and the software appliance comprises a plurality of microservices hosted in a plurality of software containers, wherein each of the software containers comprises all respective dependencies required for the corresponding microservice to be run within the respective software container;
computer readable program code configured to send the data to a first one of the plurality of microservices hosted in a first one of the plurality of software containers, wherein the first microservice comprises data science logic;
computer readable program code configured to analyze the data using the data science logic to generate a result at the first microservice, wherein the result indicates whether the data indicates an anomaly involving the first mainframe computing system;
computer readable program code configured to determine whether to send the result to a second one of the plurality of microservices hosted in a second one of the plurality of software containers based on whether the result indicates an anomaly involving the first mainframe computing system, wherein the second microservice comprises logic to determine an alert condition based on results received from other microservices in the software appliance.

13. A system comprising:
a first mainframe computing system comprising:
hardware resources comprising a data processing apparatus;
a plurality of logical partitions (LPARs) of the hardware resources,
wherein:
a first one of the plurality of LPARs hosts a first operating system and an application, and
a second one of the plurality of LPARs hosts a second operating system and a software appliance comprising a plurality of microservices hosted in a plurality of software containers on the second operating system,
wherein each of the software containers comprises all respective dependencies required for the corresponding microservice to be run within the respective software container, and
wherein the plurality of microservices are interconnected and comprise:
a data analytics microservice hosted on a first one of the plurality of software containers, wherein the data analytics microservice comprises data science logic to analyze data describing performance attributes of at least the first LPAR to generate a result; and
an alert manager microservice hosted on a second one of the plurality of software containers, wherein the alert manager microservice is to receive the result from the data analytics microservice and comprises logic to determine an alert condition based on results received from other microservices in the software appliance, wherein the results comprise the result from the data analytics microservice.

14. The system of claim 13, wherein the first operating system is different from the second operating system, and the first operating system comprises a mainframe-specific operating system.

15. The system of claim 14, wherein the first operating system comprises zOS and the second operating system comprises a Linux operating system.

16. The system of claim 15, wherein the second LPAR further hosts a container engine to assist in implementing the plurality of software containers.

17. The system of claim 16, wherein the container engine is to run on the second operating system.

18. The system of claim 13, wherein the software appliance comprises a communications bus to interconnect the plurality of microservices.

19. The system of claim 13, wherein the plurality of microservices further comprise at least one database microservice.

* * * * *